United States Patent [19]

Andruszkiw et al.

[11] Patent Number: 4,530,638
[45] Date of Patent: Jul. 23, 1985

[54] WIND DRIVEN POWER GENERATING APPARATUS

[76] Inventors: Walter Andruszkiw, 26626 Ryan, Warren, Mich. 48091; Roman W. Andrushkiw, 41400 Malbeck, Sterling Heights, Mich. 48078

[21] Appl. No.: 558,002

[22] Filed: Dec. 5, 1983

[51] Int. Cl.³ ............................................. F03D 7/06
[52] U.S. Cl. ...................................... 415/4; 416/142
[58] Field of Search .................. 415/2 R, 3 R, 4 R; 416/142 B

[56] References Cited

U.S. PATENT DOCUMENTS

| | | | |
|---|---|---|---|
| 973,823 | 10/1910 | Stamm | 416/118 |
| 1,099,602 | 6/1914 | Houtz | 415/4 |
| 1,333,987 | 3/1920 | McManigal | 415/2 R |
| 1,413,861 | 4/1922 | McDowell | 416/142 B X |
| 1,455,950 | 5/1923 | Willman | 415/2 R |
| 1,502,950 | 7/1924 | Greenbrook | 415/4 |
| 1,531,964 | 3/1925 | McHenry | 415/2 R X |
| 1,534,799 | 4/1925 | Maine | 415/2 R |
| 1,779,743 | 10/1930 | Matthews | 415/2 R |
| 4,342,539 | 8/1982 | Potter | 416/142 B X |
| 4,449,887 | 5/1984 | Mundhenke | 416/132 B X |

FOREIGN PATENT DOCUMENTS

| | | | |
|---|---|---|---|
| 880130 | 3/1943 | France | 416/DIG. 8 |
| 973968 | 2/1951 | France | 415/2 R |
| 55-19930 | 2/1980 | Japan | 416/142 B |
| EP25023 | 3/1981 | PCT Int'l Appl. | 416/196 A |

Primary Examiner—Everette A. Powell, Jr.
Attorney, Agent, or Firm—Myron B. Kapustij

[57] ABSTRACT

A wind driven power generating apparatus which is automatically vertically adjustable depending upon the wind velocity.

6 Claims, 14 Drawing Figures

WIND DRIVEN POWER GENERATING APPARATUS

SUMMARY OF THE INVENTION

The instant invention is directed to a wind driven power generating apparatus which is automatically vertically adjustable depending upon the wind velocity. When the wind velocity is high the apparatus is automatically lowered into a well in which it is mounted so that the force of the wind impinging thereon is decreased. When the wind velocity is low the apparatus is automatically raised from out of the well so that maximum advantage is taken of the available wind force.

DESCRIPTION OF THE INVENTION

The instant invention is directed to a wind driven power generating apparatus which is provided with means for vertical adjustment within a well in which it is disposed, said adjustment being dependent upon the wind velocity. Thus, when the wind velocity is high the power driven power generating apparatus is automatically retracted into the well in which it is seated. When the wind velocity is low the apparatus is automatically raised out of the well in order to take maximum advantage of the available wind force.

In another embodiment of the instant invention the rotation of the power vanes of the power generating apparatus can be maintained at a constant rate by either raising the power generating apparatus out of its well and into the full force of the wind at low wind velocities, or by lowering the power generating apparatus into its well as the wind velocity increases.

Figure 1:
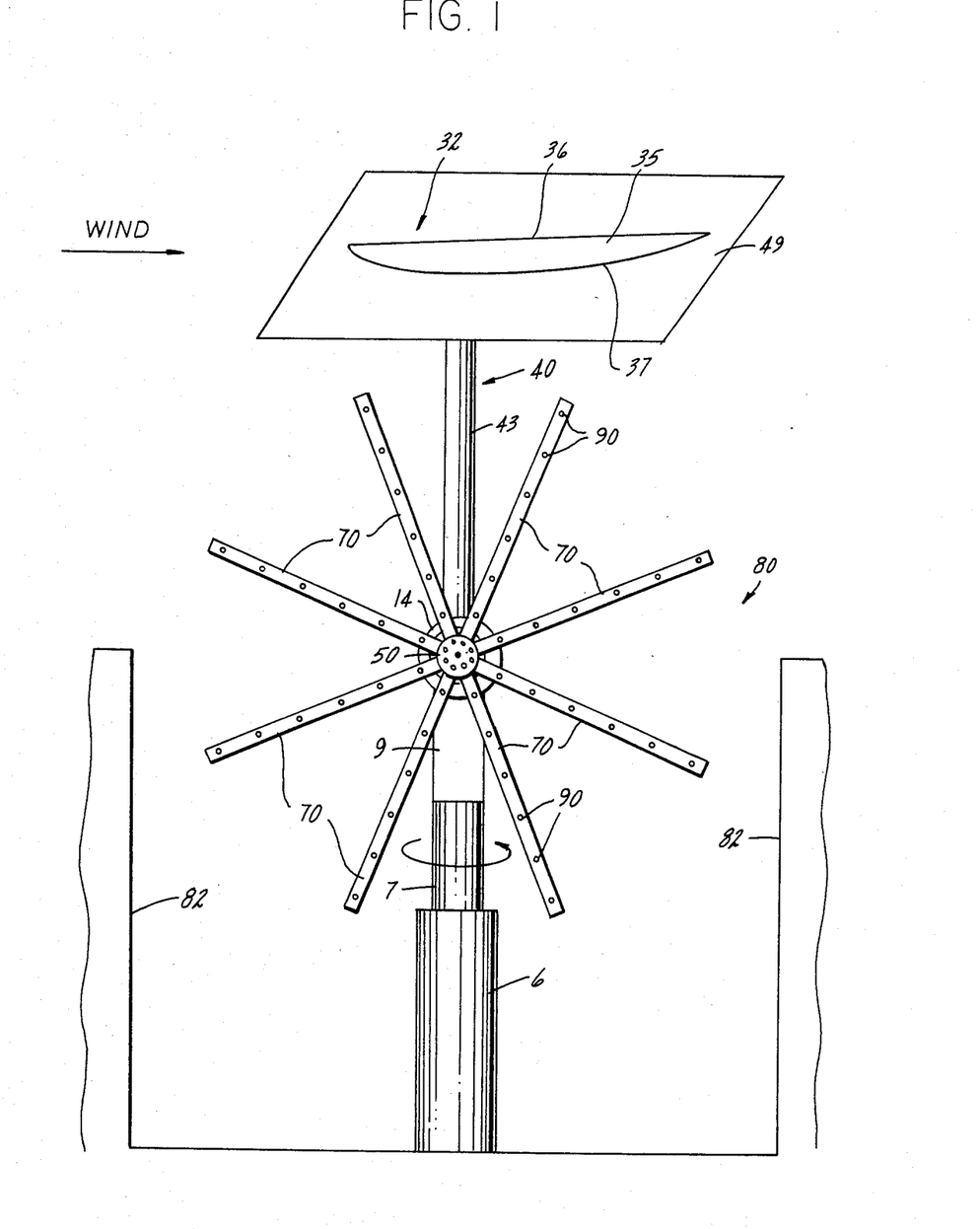
FIG. 1 is a side elevational view of the apparatus of the instant invention in a fully extended condition.

As illustrated in FIG. 1 the wind driven power generating apparatus is comprised of a horizontally extending shaft 50 on which are fixedly mounted a plurality of radially extending power vanes 70 and 70a. The wind impinges upon these vanes 70 and 70a thereby causing movement of these vanes and the consequent rotation of shaft 50. The vanes are divided into two groups or sets 70 and 70a which are axially spaced apart from each other and are disposed on either side of the central portion of the shaft 50. The axially or longitudinally outer surfaces of the power vanes 70 and 70a have a concave shape in order to conform to the circular walls 82 of the generally circular in cross section well in which the power generating apparatus is disposed.

Figure 4:
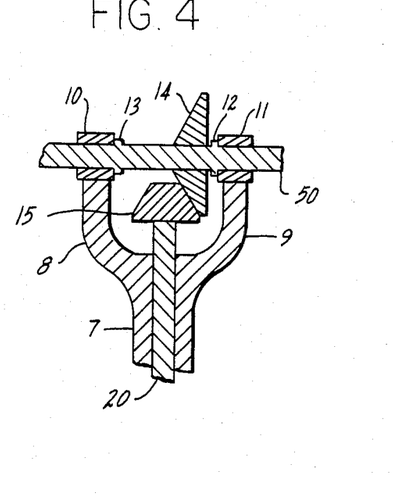
FIG. 4 is a front sectional view of the shaft, shaft support members, and shaft support arms of the apparatus of the instant invention.
Figure 5:
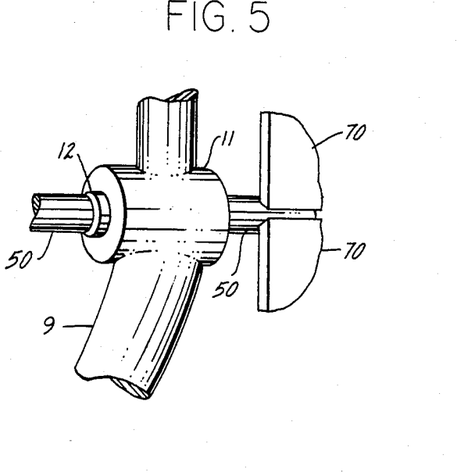
FIG. 5 is a perspective view of part of the shaft, vanes, shaft support member, and shaft support arm of the instant invention.

As best shown in FIGS. 4 and 5 axially inwardly of vanes 70 and 70a are two annular shaft support members 10 and 11. Shaft 50 is rotatably mounted in these annular support members 10 and 11. Shaft 50 has two bossed sections 12 and 13 disposed axially inwardly of annular support members 10 and 11. These two bossed sections function to limit the axial or longitudinal movement of shaft 50 in annular support members 10 and 11. Fixedly mounted on shaft 50 intermediate the bossed portions 10 and 11 is bevel gear 14. This bevel gear 14 is longitudinally disposed on said shaft 50.

Annular support members 10 and 11 are fixedly mounted on the upper ends of vertically extending bifurcated support arms 8 and 9. These support arms 8 and 9 terminate at their lower extremities, i.e., at the ends opposite the ends on which the annular support members 10 and 11 are disposed, in support column 7.

Figure 3:
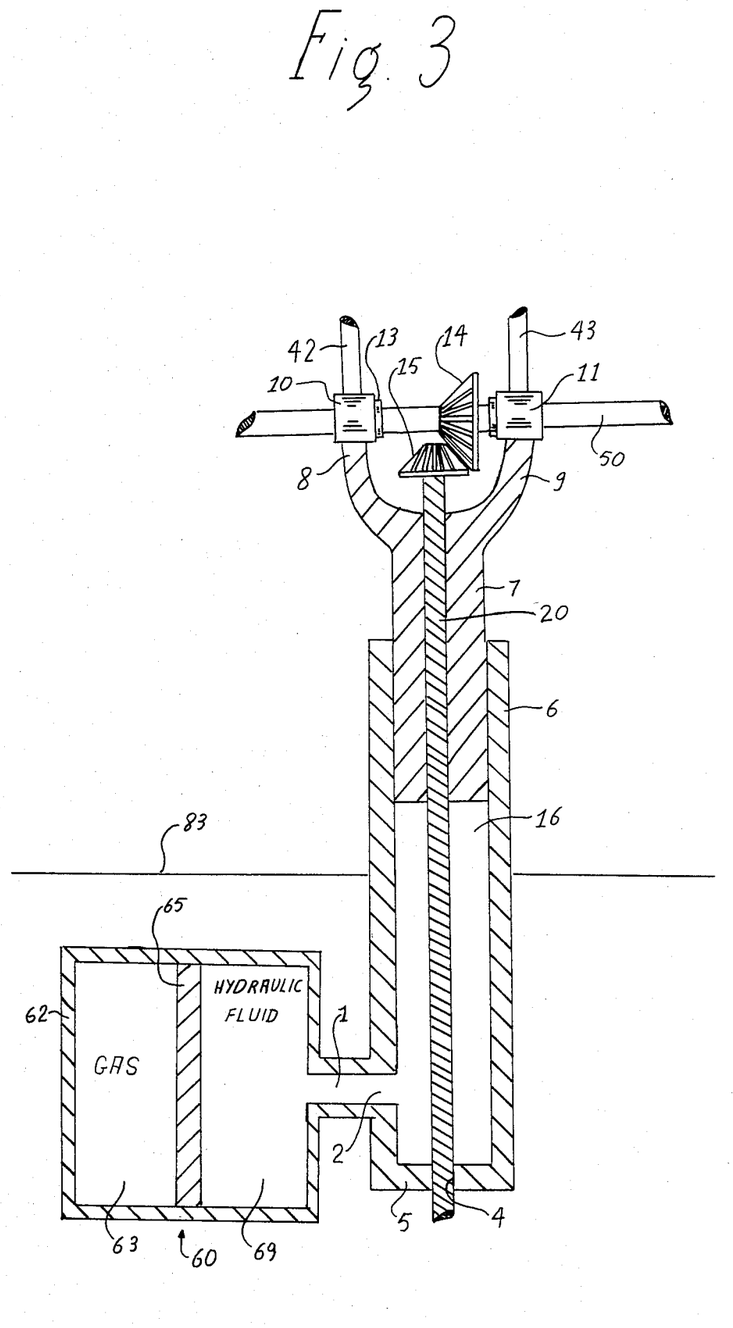
FIG. 3 is a front sectional view of part of the apparatus of the instant invention.

Vertical support column 7 is bifurcated at its upper end to from the two support arms 8 and 9. These support arms, as shown in FIG. 5, have a generally circular cross section. At its lower end, i.e., the end opposite the bifurcated end, vertical support column 7 has a circular cross section. As shown in FIG. 3 vertical support column has a cavity of circular cross section extending longitudinally or axially through the central longitudinal axis thereof. This cavity is adapted to receive drive shaft 20 therein. Drive shaft 20 is rotatably mounted within this cavity within vertical support column 7.

Figure 2:
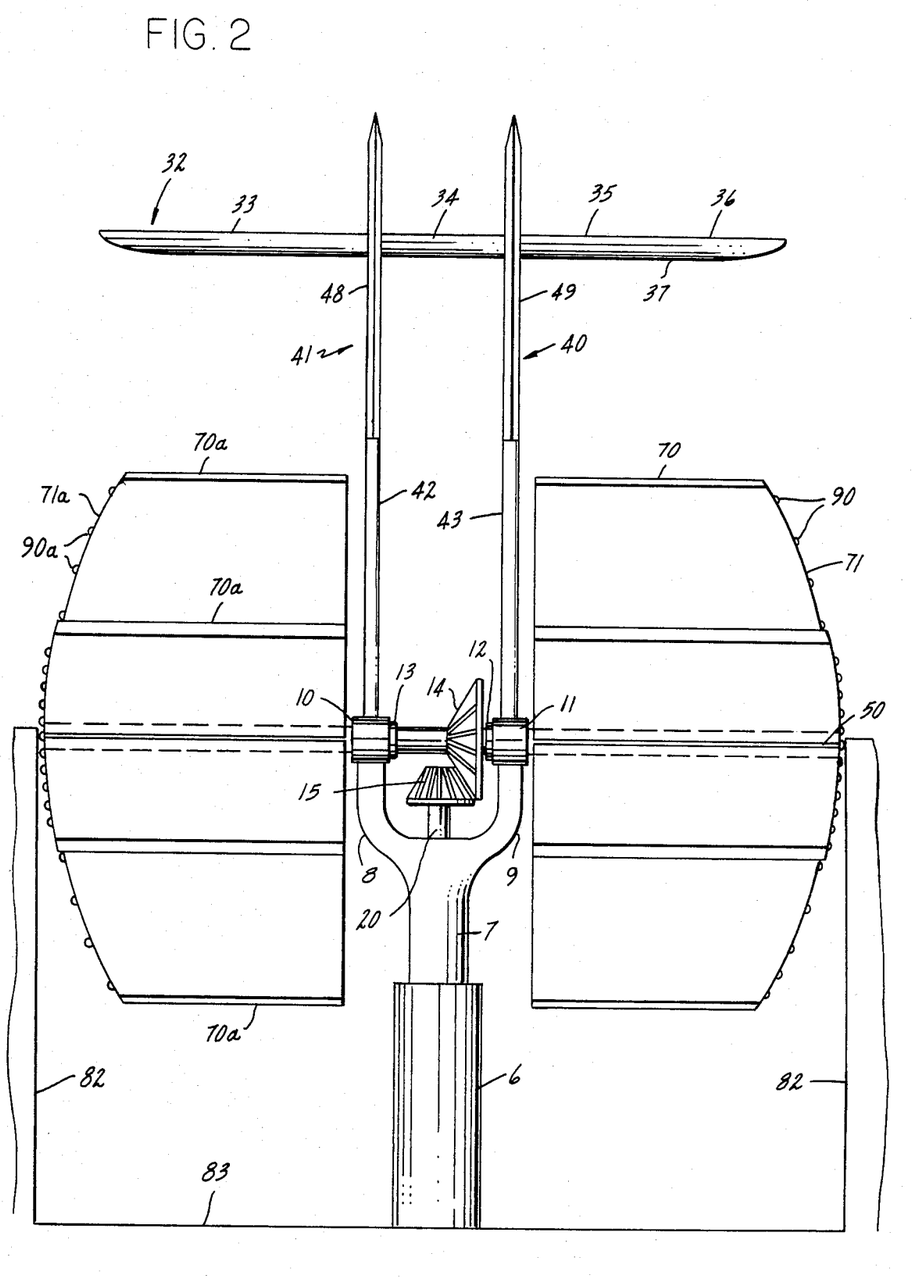
FIG. 2 is a front view of the apparatus of the instant invention in a fully extended condition.

Drive shaft 20 has fixedly mounted at one end thereof, i.e., at its upper end, bevel gear 15. Bevel gear 15 is vertically extending and is in meshed contact with bevel gear 14 on shaft 60. As shown in FIGS. 2,3 and 4 bevel gear 15 is disposed between and equadistant from support arms 8 and 9.

The wind impinging upon drive vanes 70 and 70a causes rotational movement of these vanes which are fixedly mounted on shaft 60. Movement of vanes 70 and 70a causes rotational movement of shaft 50. The rotation of shaft 50 causes rotation of bevel gear 14 which is fixedly mounted on shaft 50. Rotation of bevel gear 50 causes rotation of bevel gear 15 with which it is in meshed contact. Rotation of bevel gear 15 causes rotation of drive shaft 20 upon which bevel gear 15 is fixedly mounted. Drive shaft 20 is attached at its lower end, i.e., the end opposite the end upon which bevel gear 15 is mounted, to an electric power generator. The rotation of drive shaft 20 thus drives or powers the power generator, thereby producing electrical power.

The means and structures for either lowering or raising the power generating apparatus in the well 80 within which it is disposed will now be described.

A vertically extending tubular member 6 is fixedly mounted in the floor 83 of well 80. As shown in FIG. 3 tubular member is hollow. i.e., it has a longitudinally or axially extending cavity 16 therein. Tubular member 6 is open at its upper end to telescopically receive the bottom portion of vertical support member 7 therein. Support member 7 is free to move in a vertical direction within tubular member 6 and to rotate about its longitudinal axis. At its bottom end tubular member 6 is closed by a horizontal flat end wall 5. Wall 5 is circular in shape and has a small circular orifice centrally extending therethrough. This orifice 4 is adapted to have drive shaft 20 extend therethrough.

As shown in FIG. 3 adjacent the bottom end of tubular member 6 is a radially extending opening 2 which opens onto port 1 which communicates with the internal cavity 64 in cylinder 60.

Cylinder 60 is comprised of cylindrical side wall member 61 and two generally flat end wall members 62 and 67. End wall members 62 and 67 are circular in shape and form the two closed ends of cylinder 60. End wall member 67 has a circular opening 60 centrally located therein which opens onto port 1. A free floating piston, freely movable in an axial or longitudinal direction, is mounted in cylinder 60. The piston 65 divides the hollow interior of the cylinder 60 into two cavities 64 and 63. Cavity 63 is totally enclosed by end wall member 62, side wall member 61, and piston 65. Cavity 63 is filled with a compressable gas. Cavity 64 in cylinder 60, cavity 16 in tubular support member 6, and port 1 are all filled with a hydraulic fluid.

Upon vertically downward movement of support member 7 in cavity 16 the hydraulic fluid is forced via port 1 into cavity 64 thereby compressing the gas in cavity 63. This controls the downward movement of support member 7 and also stores up energy to return member 7 in a vertically upward direction.

Figure 1A:
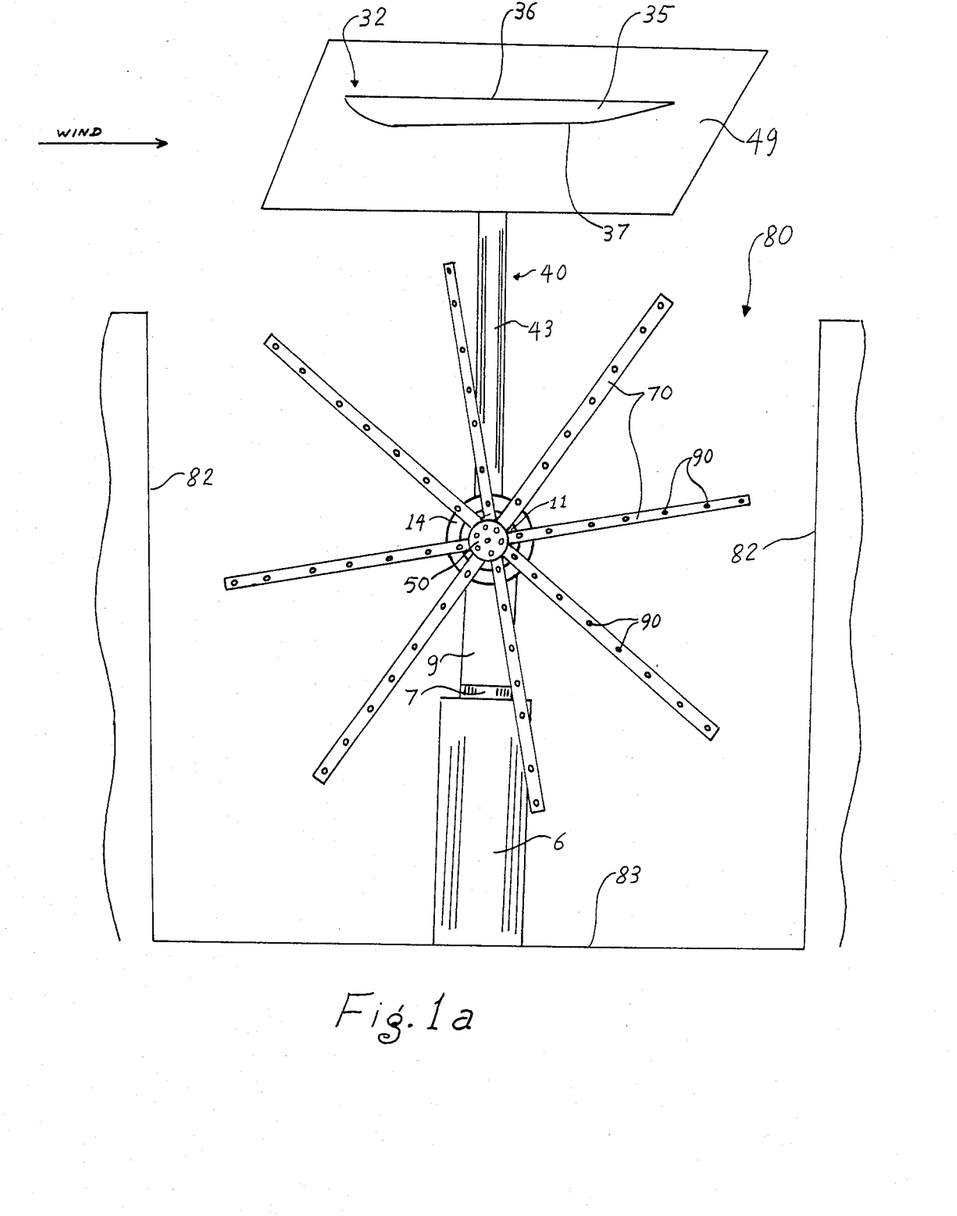
FIG. 1a is a side elevational view of the apparatus of the instant invention in a fully retracted condition.

Movement of support member 7 in a vertically upward direction within tubular member 6 is thus accomplished by the energy stored in the compressed gas in cavity 63. Movement of support member 7 in a vertically downward direction in tubular support member 6 is accomplished by the wind acting upon the wing system 32 of the apparatus, which will be described hereinafter. Wing system 32 is comprised of two outer wing panels 35 and 33 and a central wing panel 34. Wing panels 33, 34, and 35 as shown in FIGS. 1 and 1a, have a flat top surface and a rounded or generally convex bottom surface. The wing system of the instant invention is thus the reverse of a wing system on an airplane. The instant wing system instead of providing lift as on an airplane, is forced in a vertically downward direction by the wind blowing over its surfaces. The greater the wind velocity over the wing system, the greater the downward force or inverse-lift of the wing system. The wing system is mounted, fixedly, on the annular shaft support members 10 and 11 by means of wing support and guide members 40 and 41. Wing support and guide members 40 and 41 are comprised of, at their lower portions, of two vertically extending tubular members 43 and 42 which are fixedly attached, at their lower ends, to annular shaft support members 10 and 11. The upper portions of wing support and guide members are comprised of directional control vanes 48 and 49. These directional control vanes 48 and 49 are generally flat vertically extending members of a generally trapezoidal shape with a knife like leading edge. These control vanes serve to turn the apparatus, particularly support member 7 mounted in tubular support member 6, so that the vanes 70 and 70a always have their faces facing the wind.

Thus, while the wing system combined with the aforedescribed cylinder 60 serve to control the vertical telescoping movement of the instant apparatus within the well 80, the directional control vanes control the rotational movement of the apparatus so that the power vanes 70 and 70a are always facing the wind.

In the operation of the wind driven power generating apparatus the wind acting upon the directional control vanes 48 and 49 causes them to rotate so that their knife like leading edges are facing directly into the wind. This in turn turns or rotates the apparatus by rotating the vertical support member 7 rotatably and telescopically mounted within tubular support member 6, thereby bringing power vanes 70 and 70a broadside into the wind, i.e., the faces of the power vanes 70 and 70a are directly facing the wind force.

The power generating apparatus is automatically lowered into or extended out of the well 80 in which it is seated depending upon the wind velocity. Thus, when the wind velocity is high the inverse-lifting force of wing system 32 is increased to the point where it overcomes the resistance of the gas in cavity 63 to compression and the apparatus is lowered into the well. This is accomplished by vertical support member 7, upon which the wing system 32 is ultimately mounted, being forced downward in tubular support member 6. The telescopingly downward movement of support member 7 forces the hydraulic fluid present in cavity 16 into cavity 64 in cylinder 60, thereby moving piston 65 to compress the gas in cavity 63. When the wind velocity falls below a certain critical value the energy of the compressed gas is greater than the downward force exerted by the wing system, thus resulting in the gas expanding, moving piston 65 into cavity 64 thereby forcing the hydraulic fluid into cavity 16 with the result that the hydraulic fluid forces support member 7 telescopically upward within tubular member 6. This raises the power generating apparatus, specifically the power vanes 70 and 70a, out of the well. FIG. 1 illustrates the power generating apparatus in a fully extended position, while FIG. 1a illustrates the power generating apparatus in a retracted position.

As shown in FIG. 1 in a fully extended position the shaft 60 comes to and is even with the lip of wall 82 of the well 80. In this position the power vanes 70 and 70a have the maximum area of their faces exposed to the wind. It is important that the power generating apparatus not be any higher out of the well than to the midpoint or central longitudinal axis of the shaft 60. If the apparatus is any higher than this the effeciency of the apparatus will be drastically decreased because the wind will be blowing on the top set of power vanes 70 and 70a forcing rotation in a clockwise direction, while at the same time blowing upon the exposed bottom set of power vanes simultaneously causing rotation in a counterclockwise direction.

The vertical adjustment of the power generating apparatus within the well 80 offers several very important advantages. The first of these advantages is that the power generating apparatus is protected from damage due to very high wind velocities such as those present during severe storms and the like. Thus, for example, if the wind velocity starts to attain dangerous levels, the power generating apparatus is automatically lowered into the well, thereby protecting it from breakage and damage. This is of great advantage during storms, conditions of high winds, and the like.

The second of these advantages is that the rotation of shaft 50 can be maintained at a constant rate regardless of the wind velocity. The rotational speed or rate of shaft 50 may be expressed by the following formula $$R = VA$$

wherein R represents the rotation of the shaft, e.g., revolutions per minute; V is the wind velocity, e.g., miles per hour; and A is the total surface area of the vanes 70 and 70a which is exposed to the wind, e.g., square feet. If it is desired to maintain R constant, and since V is variable and is beyond control, A can be varied or adjusted so that V×A gives a constant R for varying values of V. Thus, for example, if V is large A can be made small or decreased, and if V is small or decreases then A can be increased proportionaly so that R is maintained constant. In practice, the apparatus of the instant invention can be so adjusted, by adjustment of the amount of gas in cylinder 60 and/or the size of the cavity 63 in which the compressible gas is enclosed, that the rotation of shaft 50 is maintained at a constant rate over a very wide range of wind velocities. Thus, for example, when the wind velocity is high the apparatus is automatically lowered into the well by the mechanisms described hereinafore. This results in less area of the vanes 70 and 70a being exposed to the wind and, therefore, according to the formula set forth above the rotational speed of the shaft 50 remains fixed at the same rate as when the wind velocity were lower and more surface area of the vanes was exposed to the wind. If the wind velocity decreases the apparatus is automatically extended out of the well thereby exposing a greater surface area of the vanes 70 and 70a for the wind force to act upon, thereby resulting in the rotational speed of the shaft 50 being the same as that when conditions of higher wind velocity were existant.

By adjusting the force necessary to compress the gas in cylinder 60 by piston 65, a predetermined rotational speed of shaft 50 can be selected. Thus, for example, if the force necessary to compress the gas in cylinder 60 is large (said force being mainly provided by the downward motion exerted upon member 7 by the inverted wing system 32) the rotational speed of the shaft 50 will be high. This is due to the fact that a high wind velocity will be required for the wing system 32 to develope sufficient inverse-lift to overcome the resistance to compression of the gas in cylinder 60 and thereby lower or retract the apparatus into the well. Therefore, the vanes 70 and 70a will have a large portion of their surface area exposed to the wind, blowing at a high velocity, and since V and A are both high than R must necessarily also be high. If, on the other hand, the resistance to compression of the gas is low, a lower wind velocity is required to develope sufficient inverse-lift in the wing system 32 to overcome the resistance to compression, and thereby retract or lower the apparatus into the well. Therefore, the vanes 70 and 70a will have less of their surface areas exposed to a wind of lower velocity, thereby resulting in a slower rotation of shaft 50.

Figure 9:
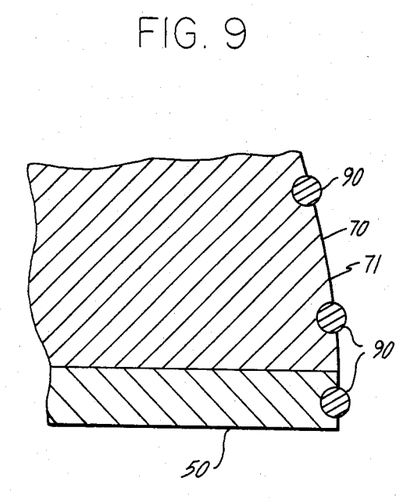
FIG. 9 is an elevated sectional view of the power vanes and the shaft of the apparatus of the instant invention.
Figure 10:
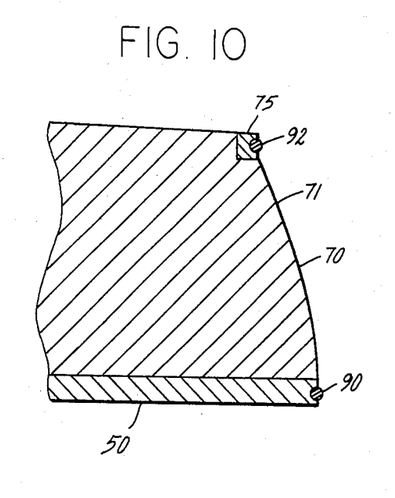
FIG. 10 is an elevated sectional view of another embodiment of the power vanes of the apparatus of the instant invention.
Figure 11:
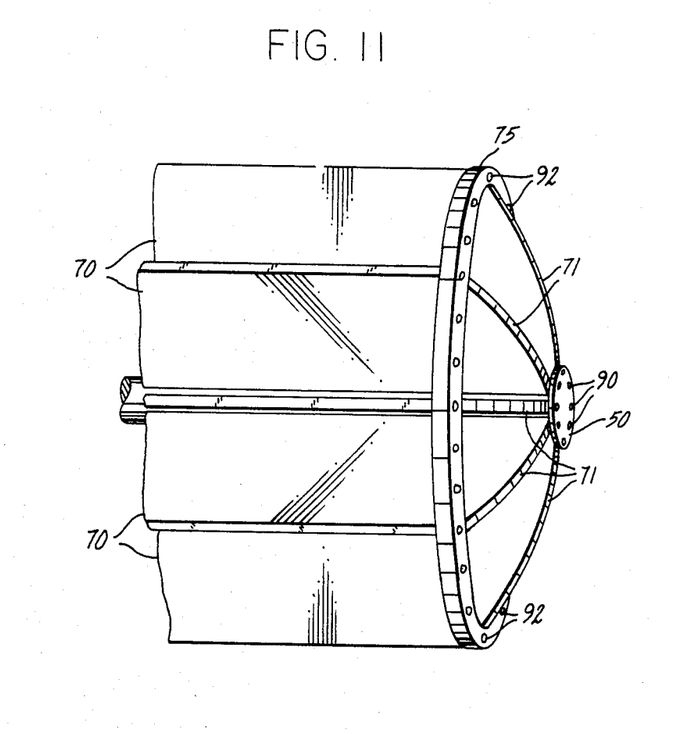
FIG. 11 is a perspective view of the power vanes of the embodiment shown in FIG. 10.

In one embodiment of the instant invention, as illustrated in FIGS. 1, 1a, 2, 6, 7, 8 and 9, the axially outer edges 71 and 71a of the vanes 70 and 70a are convex and have a plurality of anti-friction devices such as ball bearings 90 and 90a rotatably mounted therein. As shown in FIG. 9 the ball bearings 90 are rotatably mounted in concavely shaped cavities 91 cut into the edge 71 of the vane 70.

Figure 6:
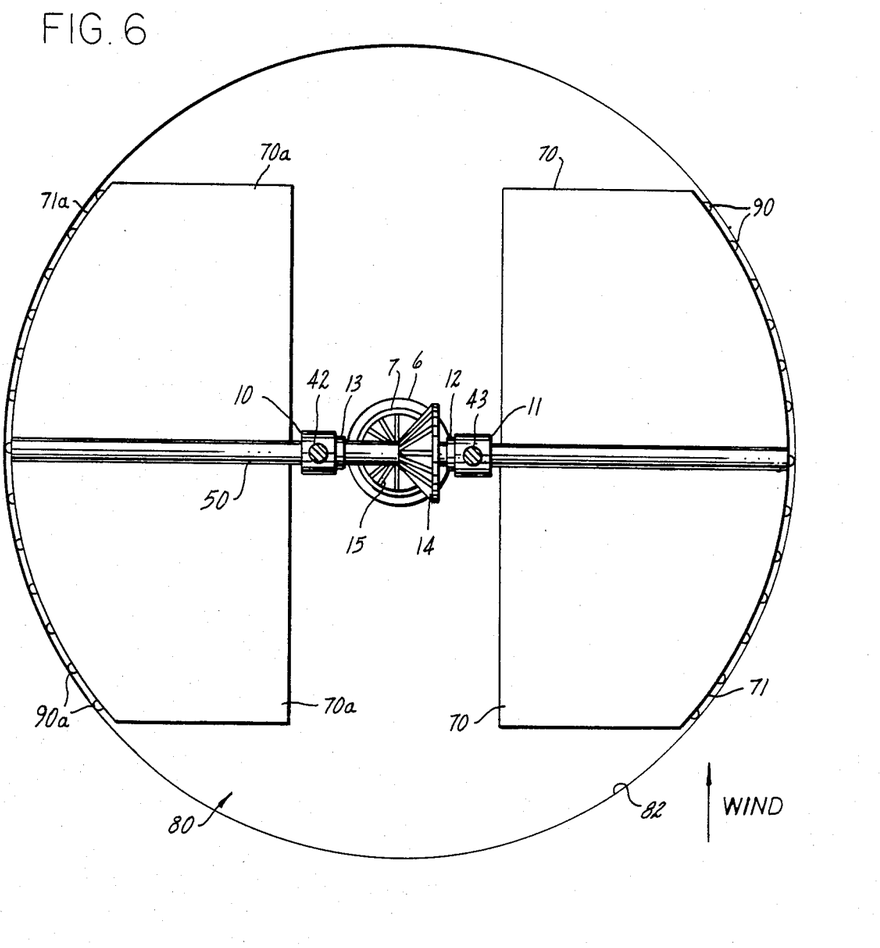
FIG. 6 is a plan view of the apparatus of the instant invention taken along lines 6—6 in FIG. 2.
Figure 7:
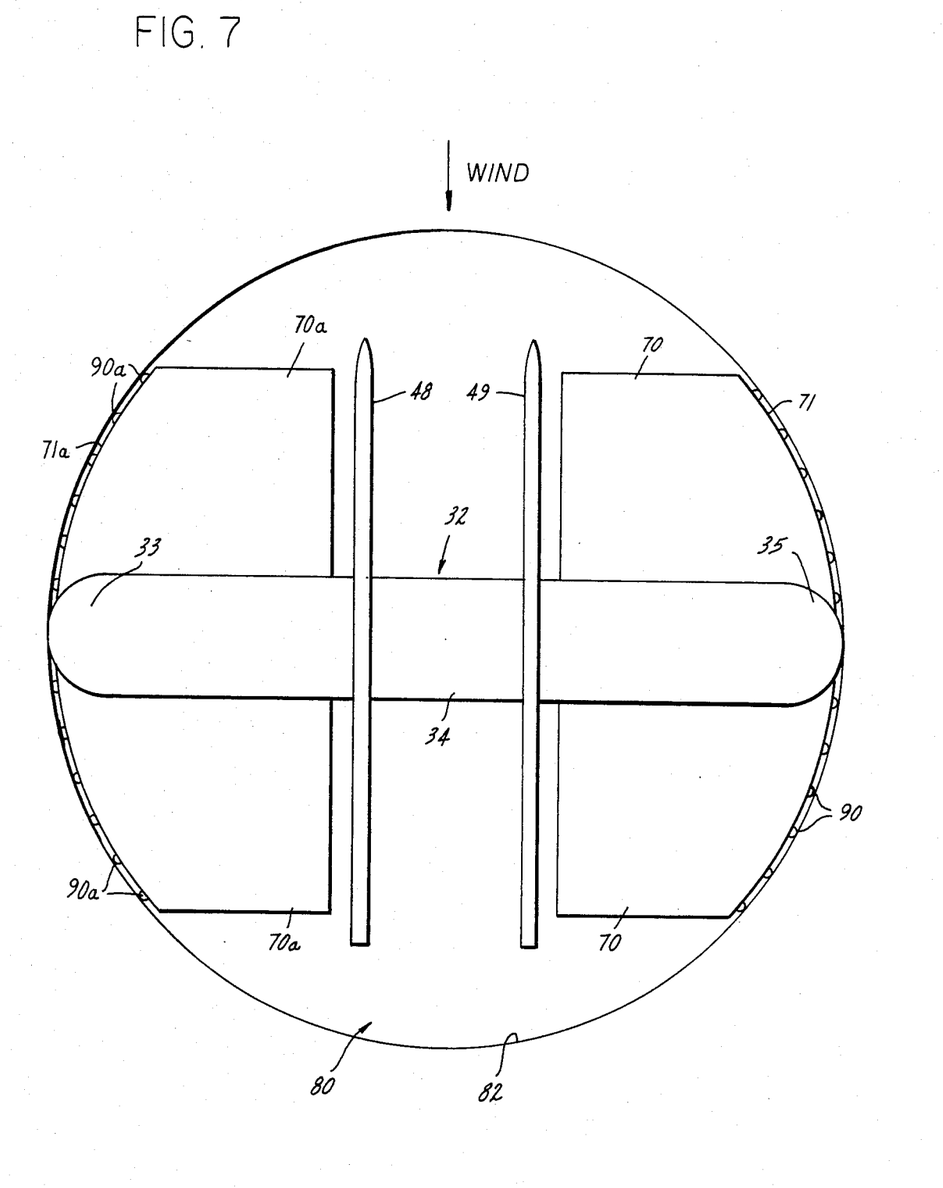
FIG. 7 is a plan view of the apparatus of the instant invention.
Figure 8:
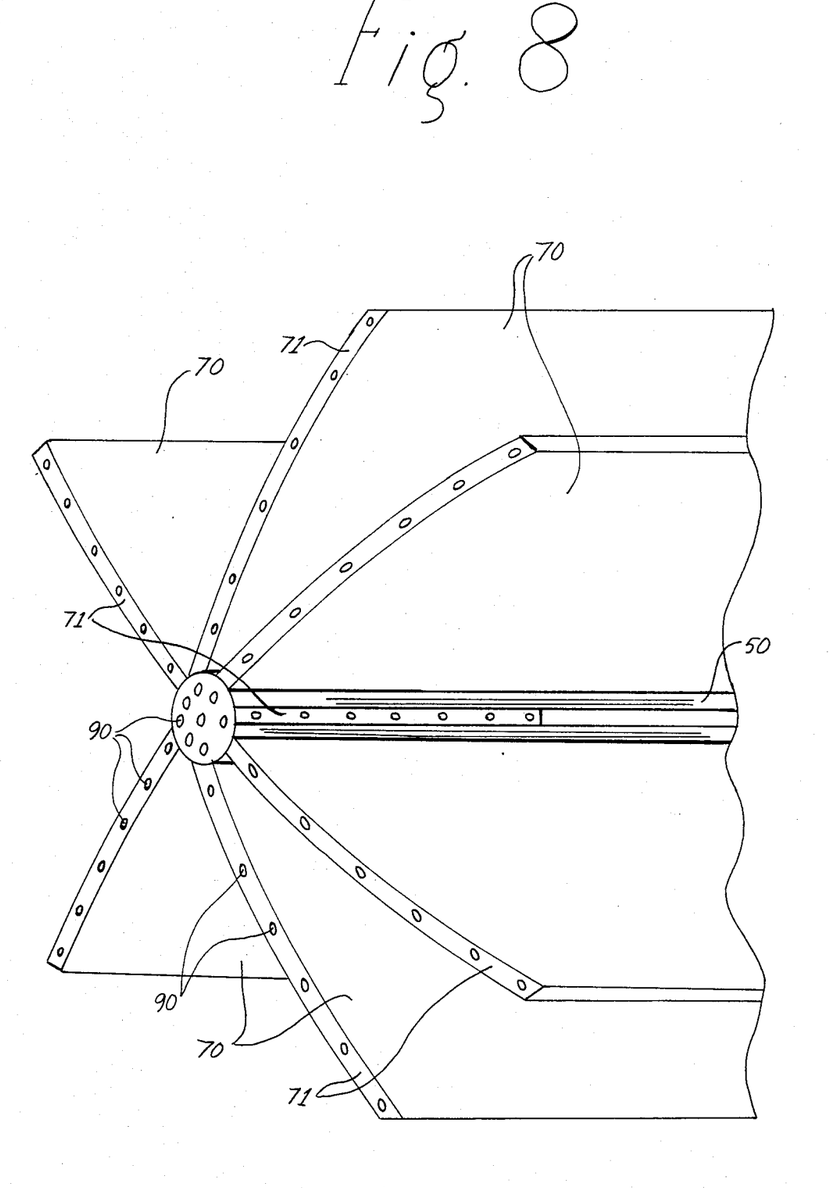
FIG. 8 is a perspective view of the power vanes of the instant apparatus.

As illustrated in FIGS. 2, 6 and 7 these ball bearings 90 and 90a come into contact with the wall 82 of the well when the vanes 70 and 70a are on the downward stroke of their rotation. The ball bearings come into contact with the wall of the well because the outer edges 71 and 71a of the vanes 70 and 70a are shaped to generally conform to the circular cross section of the well 80.

The fact that the ball bearings 90 and 90a come into contact with the walls 82 of well 80 serves to add strength and support to the vanes 70 and 70a and, therefore, to the apparatus as a whole, and also serves to stiffen the vanes in their rotation.

Figure 12:
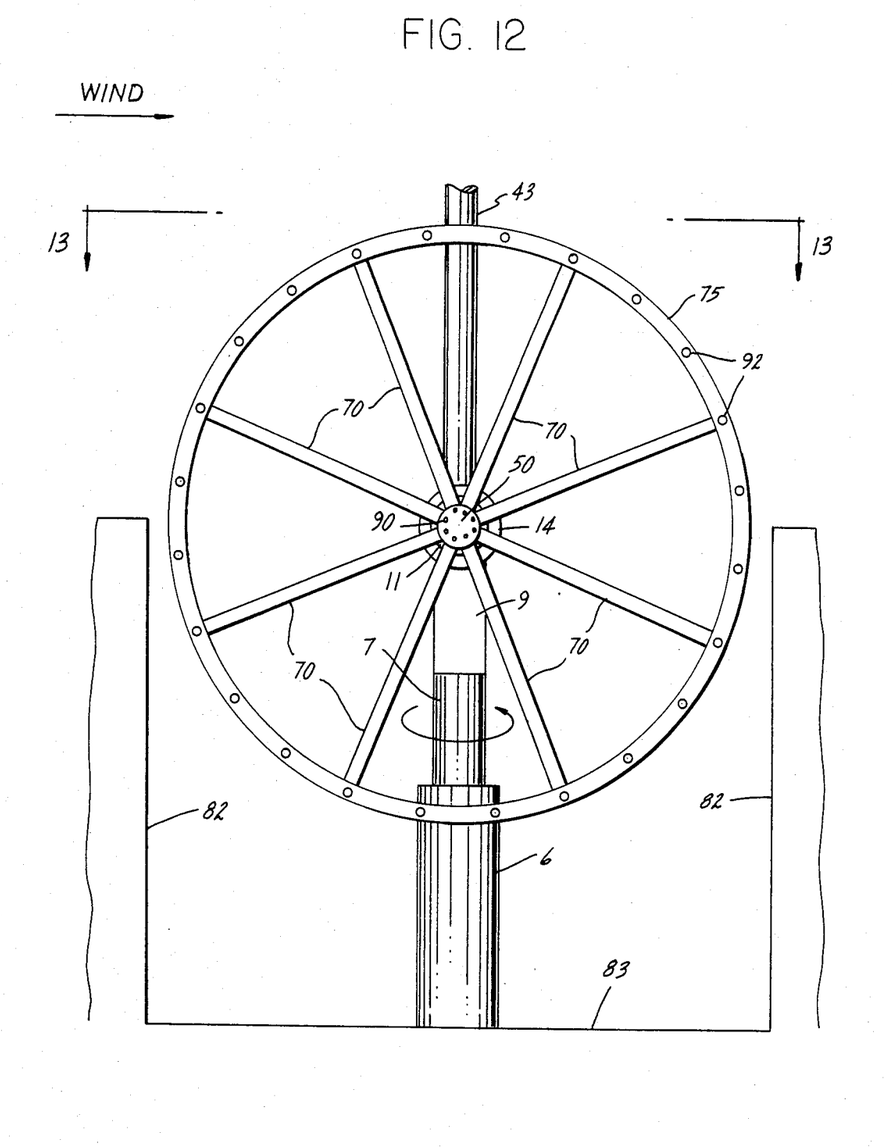
FIG. 12 is a side elevational view of the apparatus of the instant invention with the vanes of the embodiment shown in FIGS. 10 and 11.
Figure 13:
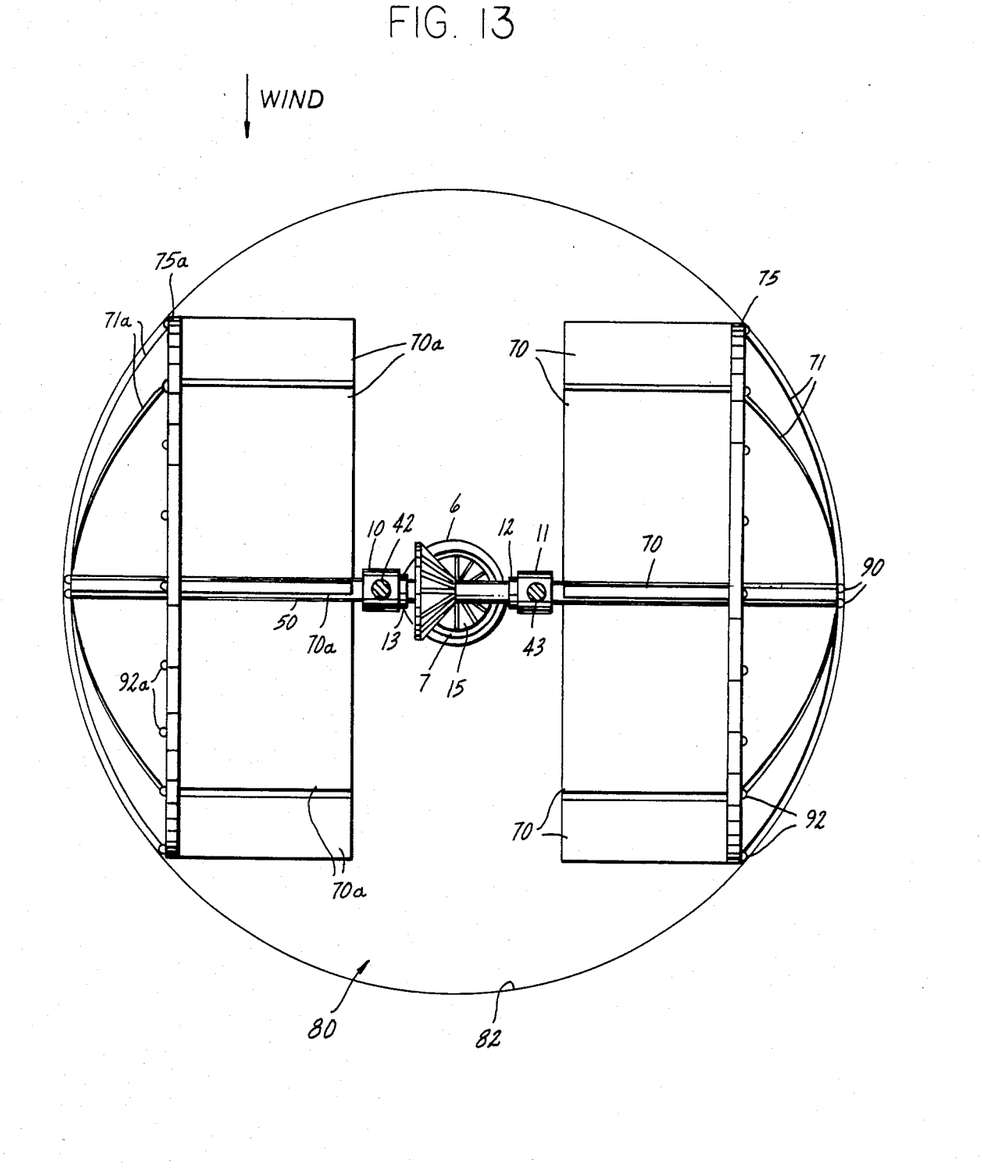
FIG. 13 is a plan view of the apparatus of FIG. 12 taken along lines 12—12.

In a second embodiment, as illustrated in FIGS. 10, 11, 12 and 13, the vanes 70 and 70a also have convexly shaped axially outer edges, however there are no ball bearings mounted in these outer edges. In this embodiment there is fixedly mounted on the circumferentially outer periphery of the vanes 70 and 70a a reinforcing annular member 75 and 75a. Annular member 75 has a plurality of anti-friction members or ball bearings 92 rotatably mounted in its axially outer surface. The annular member 75 acts to stiffen and reinforce vanes 70 and 70a so as to prevent bending of the vanes. As best illustrated in FIG. 12 the ball bearings 92 rotatably mounted in the outer face of annular member 75 come into contact with wall 82 of well 80. This serves to steady, guide, stiffen and strengthen the vane members 70 and 70a, thereby allowing them to be exposed to higher wind velocities than otherwise possible.

FIG. 14 illustrates yet another embodiment of the instant invention. In this embodiment the vertical support column 7 is rotatably mounted in tubular member 6. However, vertical support column 7, and therefore the entire power generating apparatus, is not free to move vertically in tubular member 6. That is to say, support column 7 is vertically fixedly mounted in tubular member 6. This is accomplished by means of annular guide member 7a, which extends radially around the circumference of member 7, and guide slot 6a which is cut into the inner circumference of the interior walls of tubular member 6 and conforms to the shape of annular guide member 7a and is adapted to receive said guide member 7a therein. This allows free rotational movement of support cloumn 7 within tubular member 6 but restricts vertical movement of column 7 within tubular member 6. Since there is no vertical movement of column 7 within tubular member 6 the embodiment of the wind driven power generating apparatus illustrated in FIG. 14 has no inverse wing system nor any cylinder and piston system, which systems function to lower and raise the power generating apparatus in a vertical direction.

Furthermore, since the power generating apparatus illustrated in FIG. 14 is not mounted in a well, the vanes 77 and 77a need not have a convex outer edge to conform to the wall of the well. It is indeed preferable that the vanes 77 and 77a have a generally rectangular shape. The power generating apparatus illustrated in FIG. 14 may be conveniently mounted on the top of a house, on the ground, or in any other location where conventional windrills are mounted.

Fixedly mounted on annular shaft support members 10 and 11, by means of vertically extending tubular support members 42 and 43, are directional control vanes 48 and 49. These directional control vanes are of the same type and configuration as described hereinafore and function in the same way in order to turn the power generating apparatus so that the faces of vanes 77 and 77a are facing into the wind.

It will thus be seen that the objects set forth above among those made apparent from the preceding description and drawings are efficiently attained, and since certain changes may be made in the structures set forth and described without departing from the scope of the instant invention, it is intended that all matters contained in the above description and drawings shall be interpreted as illustrative and not in a limiting sense.

What is claimed is:

1. A vertically adjustable and horizontally rotatable wind driven power generating apparatus comprised of, in combination a well having a generally circular cross section in which is rotatably and vertically movably mounted a wind driven power generating apparatus comprised of:

(i) power generating means comprised of a horizontally extending shaft having two end portions and a central portion, a plurality of radially and axially extending shaped wind catching vanes fixedly mounted on both end portions of said shaft, two annular shaft support members in which said shaft is rotatably mounted disposed intermediate said vanes in the central portion of said shaft, and an axially extending bevel gear mounted on the central porton of said shaft intermediate said annular shaft support members;

(ii) means for vertical and rotational movement of said power generating means comprised of (a) a hollow vertical support column having a lower end and an upper end, said lower end having a circular cross section and said upper end being bifurcated to form two support arrms which are fixedly attached at their upper ends to and support said annular shaft support members, and (b) a vertically extending tubular member having a hollow interior therein fixedly mounted at one end in the well floor and open at its other end and adapted to rotatably and telescopically receive said lower end of said hollow vertical support column;

(iii) vertical movement control means comprised of (a) downward movement control means comprising an inverted wing system mounted on top of the annular shaft support members, and (b) upward movement control means comprising a cylinder having an axially movable piston therein, said piston defining an enclosed cavity within said cyclinder which contains a compressible gas and a second cavity containing a hydraulic fluid and in communication with the hollow interior of said vertically extending tubular member;

(iv) rotational movement control means comprising at least one vertically extending directional control surface mounted on at least one of said annular shaft support members; and (v) power transmission means comprising a vertically extending drive shaft rotationally mounted in and longitudinally extending through said hollow vertical support column, said drive shaft being connected at its lower end to and driving a generator, and having fixedly mounted at its upper end a vertically extending bevel gear which is in meshed contact with said bevel gear on said horizontally extending shaft.

2. The apparatus of claim 1 wherein said shaped wind catching vanes have a convex axially outer edge.

3. The apparatus of claim 2 wherein said vanes have anti-friction devices mounted in said convex outer edges.

4. The apparatus of claim 3 wherein said antifriction devices comprise a plurality of ball bearings rotatably mounted in said edges of said vanes.

5. The apparatus of claim 2 wherein said vanes have a reinforcing annular member extending circumferentially around their radially extending outer edges.

6. The apparatus of claim 5 wherein said reinforcing annular member has a plurality of ball bearing rotatably mounted in its axially outer surface.

* * * * *